(12) United States Patent
Ramsden et al.

(10) Patent No.: US 11,620,052 B1
(45) Date of Patent: Apr. 4, 2023

(54) SHIELDING A STORAGE DEVICE OF A STORAGE SYSTEM

(71) Applicant: EMC IP Holding Company LLC, Hopkinton, MA (US)

(72) Inventors: Raymond Ramsden, Seattle, WA (US); Antony Richards, Rose Bay (AU); Curtis Robert, Kirkland, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/491,065

(22) Filed: Sep. 30, 2021

(51) Int. Cl.
*G06F 3/06* (2006.01)
(52) U.S. Cl.
CPC ............ *G06F 3/061* (2013.01); *G06F 3/0655* (2013.01); *G06F 3/0679* (2013.01)
(58) Field of Classification Search
CPC ............ G06F 12/0866; G06F 12/0879; G06F 13/4059; G06F 2212/312; G06F 3/0607; G06F 3/0658; G06F 3/0689
See application file for complete search history.

(56) References Cited

U.S. PATENT DOCUMENTS

2022/0057956 A1* 2/2022 Liang .................. G06F 12/0284

* cited by examiner

*Primary Examiner* — Yong J Choe
(74) *Attorney, Agent, or Firm* — Amin, Turocy & Watson, LLP

(57) ABSTRACT

Shielding a storage device of a storage system from one or more storage performance enhancement procedures (SPEPs) is disclosed. A SPEP can be regarded as a procedure that manipulates data stored via a storage device in a manner that attempts to improve performance of the storage system. As such, SPEPs are generally distinct from basic reading and writing of data that is not associated with storage system performance optimization. A SPEP can typically be effectively run without storage device performance degradation, however some conditions, such as very full drives, etc., can result in substantial storage device performance degradation where one or more SPEP is performed. As such, shielding can restrict permission to perform one or more SPEPs at a storage device expected to, or actually experiencing, a threshold level of performance degradation. Shielding is distinct from conventional techniques marking a drive as failed, failing, etc., as is disclosed herein.

20 Claims, 10 Drawing Sheets

SHIELDING A STORAGE DEVICE OF A STORAGE SYSTEM

BACKGROUND

Conventional data storage techniques can employ procedures intended to optimize data storage efficiency, e.g., allocating and provisioning blocks of storage in advance, balancing and leveling data storage across different storage devices, compacting storage, freeing unused storage, supporting parallel scanning of data storage, etc. In a conventional system, these procedures, which can be referred to as one or more storage performance enhancement procedures (SPEPs), can cause a storage system to experience a performance change, for example, where a storage device does not have sufficient open storage space, SPEPs can cause the performance to plummet. As such, it can be desirable to mitigate the effects of an SPEP on a storage system.

DETAILED DESCRIPTION

Figure 1:
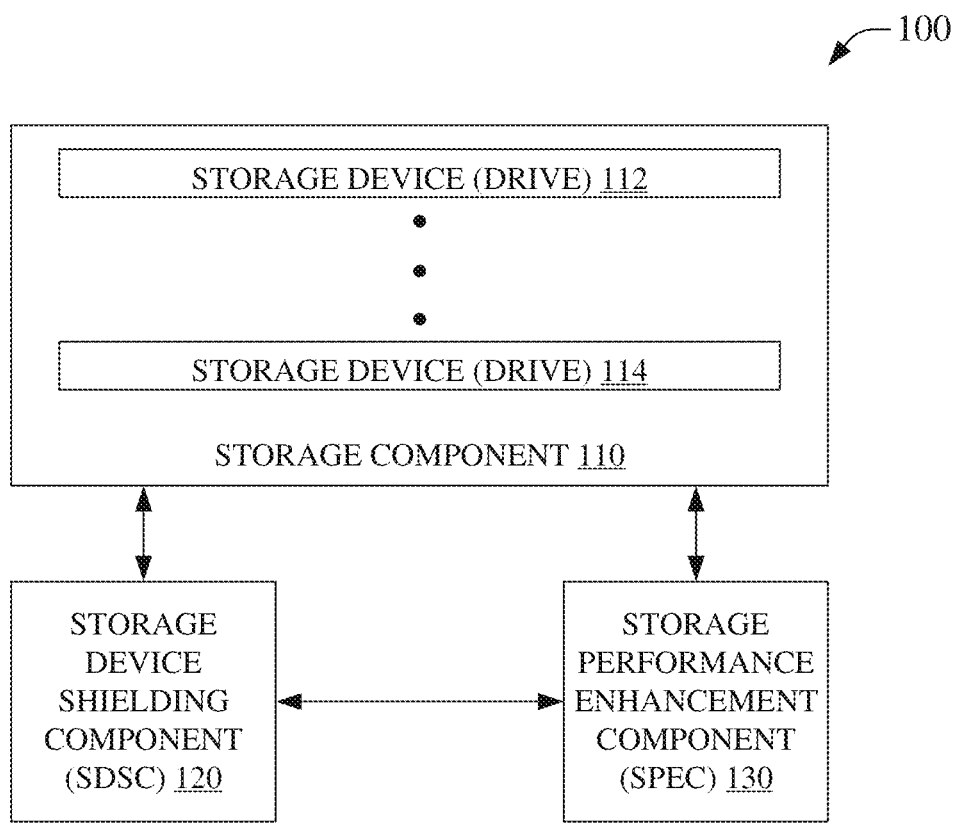
FIG. 1 is an illustration of an example system that can facilitate shielding a storage device of a storage system, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

In general, conventional data storage techniques can employ procedures intended to optimize data storage efficiency, e.g., one or more storage performance enhancement procedures (SPEPs), which can cause a storage system to experience a performance change. It can be desirable to mitigate the effects of an SPEP on a storage system, e.g., shielding a storage device of a storage system from performance changes associated with SPEPs in some storage system state, e.g., storage devices with insufficient free space, etc. In storage systems with nearly full or full drives, there can be little, if any, room on a problem drive to accommodate SPEPs. In an example, early allocation of storage blocks on a drive with plenty of storage space can be fast, for example, because contiguous blocks of storage elements of the drive can be assigned without any need to compact data prior to allocation, risking overwriting of existing data on the drive, etc. However, similarly allocating blocks of storage from a nearly full drive of the storage system can be a much more tedious process that, for example, can require that existing storage block provisioning be adapted to compact existing data to free up blocks of storage elements that can then be allocated. In this example, the compaction of existing data can be time consuming and can drastically slow early allocation of new blocks of storage from the example nearly full drive. Similar performance degradation will be readily appreciated for other SPEPs in storage systems that can, for example, comprise nearly full or full drives.

One conventional technique for addressing the aforementioned performance degradation for storage systems, for example storage systems comprising a hard drive with substantially limited free space, e.g., a drive that is full enough to cause performance degradation, can be to remove or otherwise designate the problem drive as not accessible to mitigate the performance issues. In an example where the drive is made not accessible, e.g., marking the drive as failed, physically disconnecting the drive, etc., the inaccessibility of the nearly full drive can trigger data recovery operations to other storage devices of the storage system. The data of the overfull drive can then be available via the other drives after the recovery operations. However, data recovery operations can result in a period where data of the nearly full drive is completely inaccessible, e.g., until the data is sufficiently recovered to other storage devices of the storage system, which is typically a poor experience for a customer. Moreover, data recovery operations can be computing resource intensive. Still further, making the nearly full drive inaccessible, for example via marking the drive as failed, can result in additional disk operations to free the 'failed' drive before it can be reincorporated into the storage system, e.g., unfailing the 'failed' drive after reducing the data stored on the 'failed' drive, e.g., typically completely wiping the 'failed' drive. However, where the example drive was failed merely because it was overfull, the machinations of recovering data wiping drives and reuse of the drive can be unnecessary where the over full drive can have offloaded data or been drawn down to move the drive into a condition in which it was no longer overfull. However, drawing down the drive, e.g., allowing aging data to be removed by attrition, etc., is difficult to achieve while the overfull drive is subject to performance issues from SPEPs. In conventional systems, the drive is typically treated as functioning or failed, wherein a 'functioning' drive, even when overfull and underperforming, continues to be subjected to SPEPs, with poor results, and wherein a failed drive is made inaccessible and data recovery operations can be correspondingly triggered. Neither of these conventional responses to an underperforming drive is satisfactory, especially where the underperformance is merely due to performing SPEPs on an overly full drive.

The increase in computing resources costs for failing a drive that is merely sufficiently full to cause performance issues when performing SPEPs is sufficiently undesirable that other techniques to resolve the performance issues without making the drive inaccessible have been attempted. Accordingly, another conventional technique can include a 'smartfail' process for an underperforming storage device. The smartfail can permit reading data from an example nearly full drive but can prevent any writing of data to the smartfailed drive. As such, a smartfailed drive can allow data to be read from the drive, e.g., the customer can still read their stored data, however, the smartfailed drive typically works in conjunction with recovering data to other storage devices of the storage system. In this regard, smartfail of a drive is similar to failing a drive, however under smartfail the drive can be read while the data recovery is ongoing. As such, smartfail is definitely an improvement over failing a drive, however, smartfail still can be understood as incurring the increased computing resource costs of data recovery to other drives and unfailing a smartfailed drive at a later time.

In contrast to conventional techniques that can treat a drive that underperforms due to being overfull as failing, e.g., marking the drive as failed or smartfailed, etc., the disclosed subject matter can provide an alternate solution that can avoid data recovery operations and unfailing a drive. In embodiments, an overfull drive can be shielded from one or more SPEPs but can be allowed to perform other operations, e.g., read, write, move, copy, etc. In this regard, shielding of an underperforming drive can enable drawing down of the drive, e.g., as data ages and associated storage space on the drive is freed, the drive can transition out of an overfull state. Shielding can be viewed as supporting drawing down an overfull drive, wherein the shielding of the drive isn't associated with typical responses to a 'failed' drive, e.g., data recovery operations to other drives, repair and unfailing of a 'failed' drive, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate shielding a storage device of a storage system, in accordance with aspects of the subject disclosure. System 100 can comprise storage component 110 that can comprise storage devices, e.g., storage device 112 to 114, etc. A storage device can store data at one or more storage elements comprised in the storage device. In an embodiment, a storage device, e.g., 112, 114, etc., can be a hard drive, optical drive, solid state drive, or any other storage device and, accordingly, a storage device will commonly be referred to a 'drive' herein. In embodiments, a storage system can comprise one or more of storage component 110, which can comprise one or more drives 112, 114, etc. In embodiments, any drive can be mixed with any other drive, e.g., drive 112 can be a solid-state drive and drive 114 can also be a solid-state drive, drive 112 can be a mechanical hard disk drive and drive 114 can be a magnetic tape drive, drive 112 can be a mechanical hard disk drive and drive 114 can be a non-volatile memory express hard drive, etc. As an example, a data center can comprise storage component 110 which itself can comprise many different drives 112, 114, etc., wherein some dives can be of a same type and other drives can be of dissimilar types, e.g., a first rack of drives can all be mechanical hard disk drives of a same size, brand, speed, etc., while a second rack of drives can comprise one or more other types of drives, e.g., drives of different storage modalities, different sizes, different brands, different protocols, etc.

System 100 can comprise storage device shielding component (SDSC) 120 that can limit interactions with storage devices 112-114 of storage comp 110. In embodiments, SDSC 120 can restrict permissions for performance of storage performance enhancement procedures (SPEPs) that can be indicated by storage performance enhancement component (SPEC) 130. In an example, storage component 110 can comprise drives 112-114 that can be operating nominally. In this example, SPEC 130 can indicate an intention to perform a SPEP, for example, allocation of a block of storage on drive 112. Where drive 112 is performing nominally, SDSC 120 can determine that restriction of the SPEP is unwarranted, thereby allowing storage component 110 to perform the SPEP resulting in drive 112 allocating a block of storage. In another example, storage component 110 can comprise drive 112 operating nominally and drive 114 operating at 99.5% used space, e.g., drive 114 can have only 0.5% free storage space. In this example, SPEC 130, similar to the previous example, can indicate an intention to perform a SPEP, for example, allocation of a block of storage on drive 114. Where SDSC 120 determines that drive 114 will not performing nominally due to the high level of used storage space, SDSC 120 can determine that restriction of the SPEP is warranted for drive 114, e.g., drive 114 should be shielded from the SPEP. Accordingly, in this example, permission to perform the SPEP for drive 114 can be restricted, resulting in no allocation of storage space by storage component 110 for drive 114. It is noted in this example, allocation of storage space at other drives, e.g., 112, etc., would not be restricted based on shielding of drive 114 from the SPEP.

In embodiments, some SPEPs can be more detrimental to performance of a drive than other SPEPs. As such, SDSC 120 can determine restriction of permissions per SPEP, per SPEP type/class, for all SPEPs, etc. As an example, a storage block allocation SPEP can be less detrimental to performance of a nearly full drive than a data protection SPEP, whereby SDSC 120 can permit the example storage block allocation while simultaneously restricting the data protection SPEP. In embodiments, determining restricting of SPEP permissions via SDSC 120 can be based on analysis of drive(s) performance(s), e.g., where a drive performance transitions a threshold performance, SDSC 120 can begin to restrict permission for performing one or more SPEP. Similarly, SDSC 120 can revise SPEP performance restrictions, e.g., where the example drive performance transitions another threshold performance, SDSC 120 can alter, update, or replace a restricted permission. In an example, where a drive performance further decays, greater restrictions can be applied by SDSC 120 to permit even fewer SPEPs to be performed. In another example, where a drive performance improves, SDSC 120 can apply fewer SPEP restrictions, e.g., more SPEPs can be permitted to be performed. This example can result in a drive that is initially burdened and, as a result, shielded from SPEPs by SDSC 120, returning to full use, e.g., being unshielded, where the drive become sufficiently unburdened. As an example of this, where a storage node experiences a power failure, the data on the node can become stale and allocations of storage blocks can become inaccurate such that when the storage node power is returned, the numerous SPEPs to be performed on the drives of that node to catch up the rest of the storage system can cause some of the fuller drives of the node to suffer serious performance degradation. In this example, the drives with degraded performance can be shielded for a time by SDSC 120. Moreover, in this example, where the fuller drives are permitted to free stale allocated space, these drives can be regarded as nominal rather than fuller drives, e.g., the fuller drives can draw down to nominal drives by dumping storage allocations that went stale during the power outage. Accordingly, in this example, the SPEP restrictions on the now nominal drives can be removed allowing the SPEPs to be performed at those drives and more quickly returning the storage node to normal operation than if the fuller drives had been smartfailed or failed according to conventional techniques. Moreover, in this example, restricting SPEP permissions can generally allow the fuller drives to still be read from and written to for procedures not affiliated with a restricted SPEP. As such, in this example, unlike conventional techniques to fail a fuller drive making data thereon inaccessible until recovery operations advance sufficiently, the data stored on the fuller drives in this example can remain accessible, such as, allowing the data of the fuller drives to still be read by, modified by, updated by, etc., a client. Shielding can therefore restrict performance of SPEPs that can degrade performance of storage devices of a storage system in a manner that is different from conventional techniques that fail, smartfail, etc., an underperforming storage device.

Figure 2:
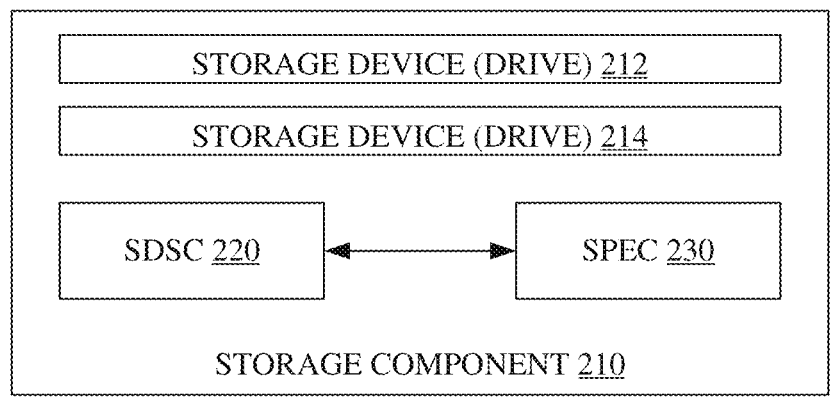
FIG. 2 is an illustration of other example systems enabling shielding a storage device of a storage system, in accordance with aspects of the subject disclosure.
Figure 2:
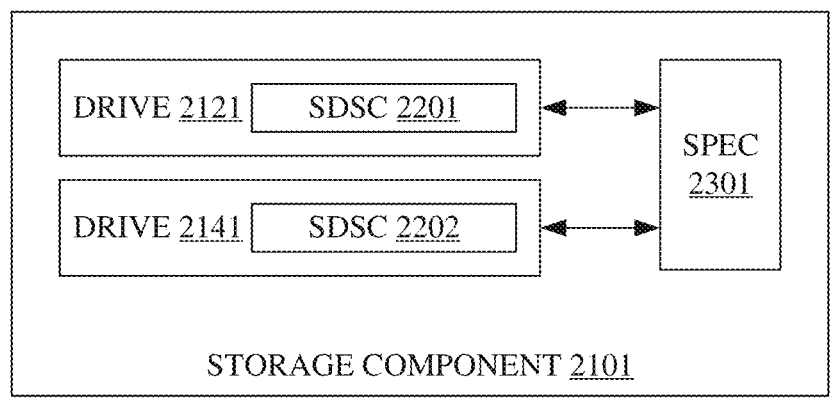

FIG. 2 is an illustration of other example systems, e.g., 200, 202, etc., enabling shielding a storage device of a storage system, in accordance with aspects of the subject disclosure. System 200 can comprise storage component 210 that can comprise storage devices, e.g., storage device 212 to 214, etc. Drives 212-214 can be the same as, or similar to drives 112-114, etc., Storage component 210, of system 200, can comprise SDSC 220. SDSC 220 can limit interactions with storage devices 212-214 of storage comp 210. Similar to other SDSC embodiments, SDSC 220 can restrict permissions for performance of SPEPs that can be indicated by SPEC 230. SPEC 230 can be comprised in storage component 210. In embodiments, SPEC 230 can be embodied in services provided by storage component 210, e.g., storage component 210 can itself determine that it is desirable to perform an SPEP, and SDSC 220 can restrict permission to perform that SPEP. In some embodiments, SPEC 230 can be regarded as inherent in a deployed storage component 210, although, as illustrated, SPEC 230 can also be embodied as a component of storage component 230. Similarly, in some embodiments, rather than SDSC 230 being operated as a separate component comprised in storage component 210, SDSC 230 can be implemented directly in storage component 210, e.g., built into the operational code, etc., of storage component 210.

In other embodiments, e.g., system 202, storage component 2101 can comprise storage devices, e.g., 2121 to 2141, etc. One or more of drives 2121-2141 can each comprise an SDSC instance, e.g., SDSC 2201, SDSC 2202, etc. The SDSCs 2201-2202, etc., can each limit interactions with a corresponding storage device 2121-2141, etc., e.g., SDSCs can be comprised in a drive to restrict permissions to perform SPEPs determined by storage component 2101, e.g., via SPEC 2301. As before, in embodiments, SPEC 2301 can be embodied in services provided by storage component 2101, e.g., storage component 2101 can itself determine that it is desirable to perform an SPEP, and a 'drive-level SDSC', e.g., 2201-2202, etc., can restrict a permission to perform the storage component 2101 determined SPEP at an individual drive, for example, based on an analysis of the performance and state of the corresponding drive. This can be regarded as drives being able to self-shield from SPEPs. In some embodiments, SPEC 2301, again, can be regarded as inherent in a deployed storage component 2101, although, as illustrated, SPEC 2301 can also be embodied as a component of storage component 230. In embodiments, SDSC enabled drives, e.g., 2201, 2202, etc., can be mixed with non-SDSC-enabled drives, e.g., 212, 214, in a storage system, e.g., 210, 2101, etc. In these embodiments, an SDSC 220 can generally be employed to shield all drives, or some drives, e.g., the drive-level SDSC can defer to SDSC 220, or non-SDSC-enabled drives can be supported by SDSC 220 while SDSC-enabled drives can self-shield. In some embodiments, a SDSC-enabled drive can support a non-SDSC-enabled drive, e.g., SDSC 2201, despite not being illustrated, can determine shielding for a non-SDSC-enabled drive comprised in storage component 2101.

Figure 3:
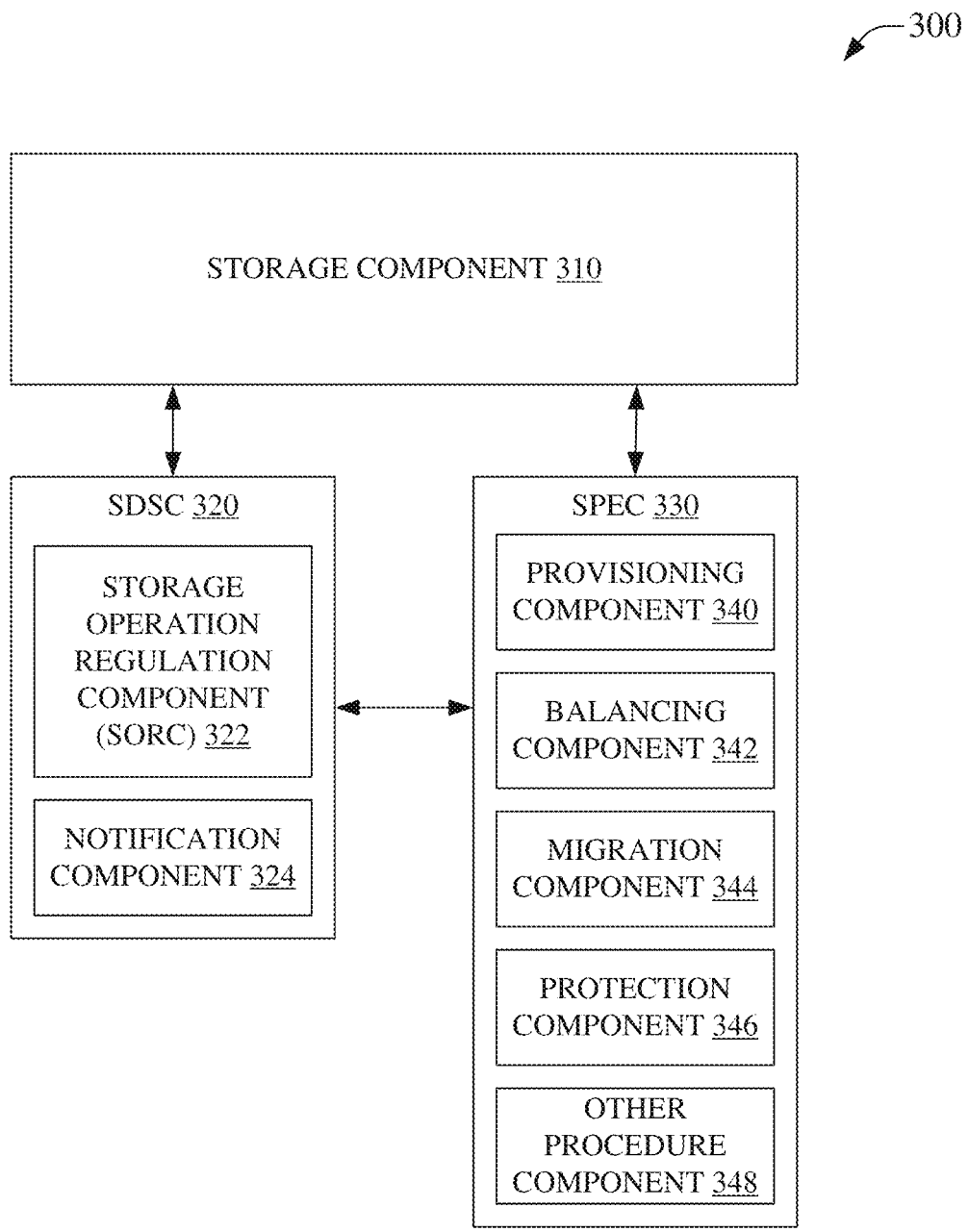
FIG. 3 illustrates an example system that can enable shielding a storage device of a storage system by restricting permission to perform one or more SPEP, in accordance with aspects of the subject disclosure.

FIG. 3 is an illustration of a system 300, which can facilitate shielding a storage device of a storage system by restricting permission to perform one or more SPEP, in accordance with aspects of the subject disclosure. System 300 can comprise storage component 310 that can comprise storage devices. A storage device can store data at one or more storage elements comprised in the storage device. In embodiments, a storage system can comprise one or more of storage component 310, which can comprise one or more drives.

System 300 can comprise SDSC 320 that can shield interactions with storage devices of storage comp 310. In embodiments, SDSC 320 can restrict permissions for performance of SPEPs that can be indicated by SPEC 330. In an example, storage component 310 can comprise a drive that can transition a first performance threshold resulting in SDSC 320 restricting a first level of SPEP permissions, e.g., the first level of SPEPs can be associated with a first level of burdening a storage device performance, such that restricting permissions for these first level SPEPs can permit second level SPEPs to still be performed at the drive. In this example, if drive is determined to have transitioned a second level of performance, SDSC 320 can restrict a second level of SPEP permissions, e.g., the second level of SPEPs can be associated with a second level of burdening a storage device performance, such that restricting permissions for these second level SPEPs can, for example, restrict, permission to perform both first and second level SPEPs.

In embodiments, SDSC 320 can comprise storage operation regulation component (SORC) 322, that can determine what SPEP permission restrictions can be associated with different levels of performance degradation for drives. In embodiments SORC 322 can establish tiers of restrictions to permissive performance of SPEPs. In an example, for a same drive in a same state, first SPEPs can be determined to degrade performance more than second SPEPs, whereby SORC 322 can designate a first performance threshold for the first SPEPs and a second threshold for the second SPEPs.

In embodiments, SPEPs can be included in more than one tier of restrictions determined at SORC 322. As an example, the above second threshold can be associated with restricting a first SPEP but not a second SPEP, while the first threshold can be associated with restricting both the first and the second SPEP. SDSC 320 can further comprise a notification component 324 that can cause a notification indicating SPEP restrictions for one or more drives storage component 310, e.g., SDSC 320, via notification component 324, can cause an alert to an entity that a drive is being shielded.

SPEC 330 can indicate an intention to perform a SPEP at one or more drives of storage component 310. In an embodiment, the SPEPs can be embodied in one or more SPEP components, e.g., provisioning component 340 that, for example, can allocate storage space of a drive, balancing component 342 that, for example, can rebalance storage on a drive or between drives, migration component 344 that, for example, can move data within a drive or between drives, protection component 346, that, for example, can protect data on a drive or between drives, or other procedure component 348 that can perform other storage performance enhancements at or between drives of storage component 310. In an example, protecting data can generally be regarded as being computationally intensive in comparison to migrating data between allocated storage blocks. Accordingly, in this example, a first protection component 336 can be affiliated with a first tier of SPEP permission restrictions by SORC 322, while a migration component 344 can be affiliated with a second tier of restrictions. Moreover, in this example, a second protection component (not illustrated) can be deployed via SPEC 330 that can apply protection with much lower computational cost, whereby this second protection component can be associated with a third tier of SPEP restrictions by SORC 322, perhaps between the previously mentioned first and second restrictive tiers. Accordingly, SDSC 320 in this example, based on the above example, can apply the first tier of restrictions to a drive based on that drive's state corresponding to the drive performance transitioning an appropriate threshold performance, whereby the drive can be shielded from the SPEPs of the first protection component 346, but can permit SPEPs of the second protection component and SPEPs of the migration component 344.

Figure 4:
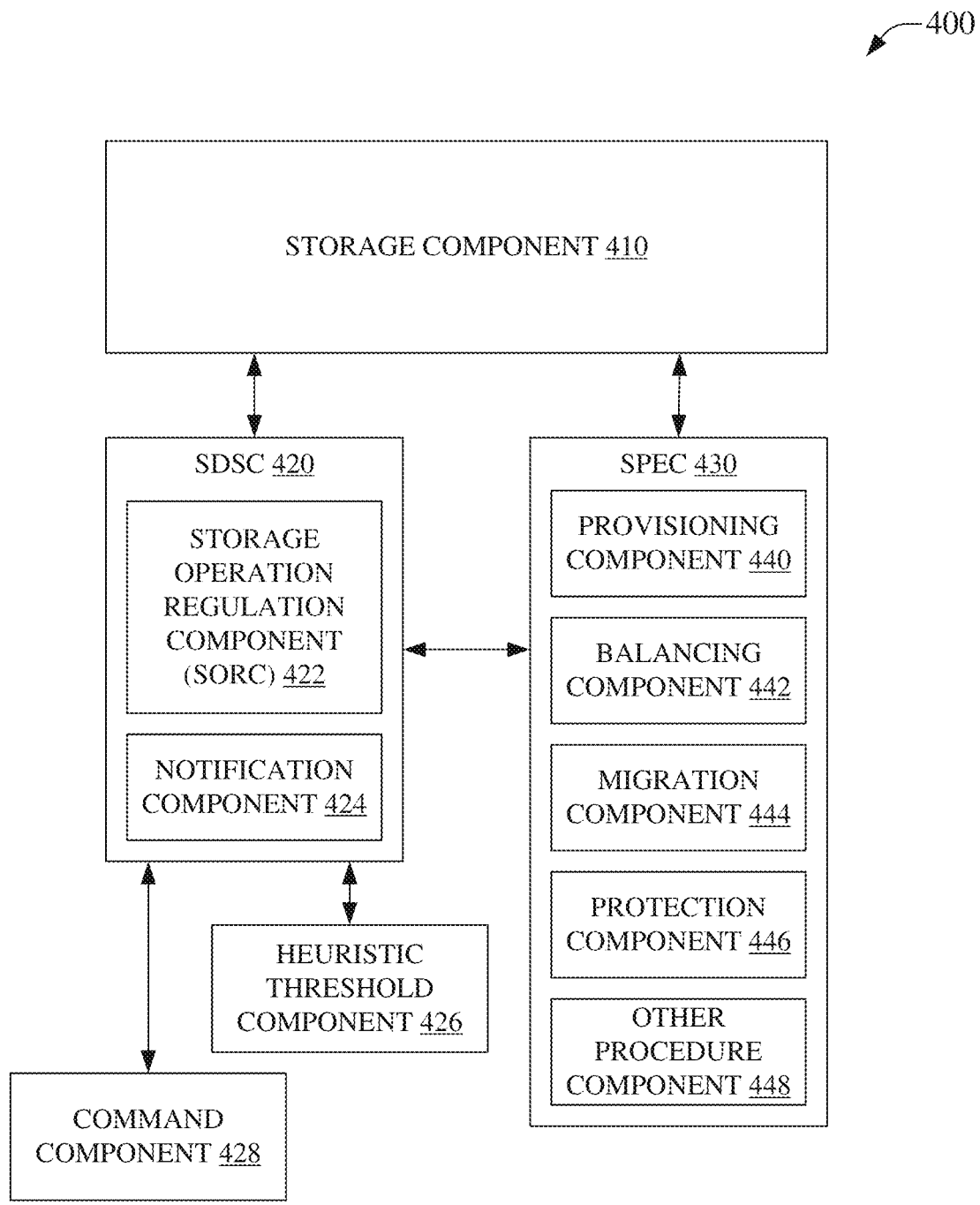
FIG. 4 is an illustration of an example system facilitating shielding a storage device of a storage system based on a heuristic threshold, in accordance with aspects of the subject disclosure.

FIG. 4 is an illustration of an example system 400, which can enable shielding a storage device of a storage system based on a heuristic threshold, in accordance with aspects of the subject disclosure. System 400 can comprise storage component 410 that can comprise storage devices. A storage device can store data at one or more storage elements comprised in the storage device. In embodiments, a storage system can comprise one or more of storage component 410, which can comprise one or more drives.

System 400 can comprise SDSC 420 that can shield interactions with storage devices of storage comp 410. In embodiments, SDSC 420 can restrict permissions for performance of SPEPs that can be indicated by SPEC 430. SDSC 420 can comprise SORC 422, that can determine what SPEP permission restrictions can be associated with different levels of performance degradation for drives. In embodiments SORC 422 can establish tiers of restrictions to permissive performance of SPEPs. SPEPs can be included in more than one tier of restrictions determined at SORC 422. SPEPs can be affiliated with corresponding SPEP components, e.g., provisioning component 440 that, for example, can allocate storage space of a drive, balancing component 442 that, for example, can rebalance storage on a drive or between drives, migration component 444 that, for example, can move data within a drive or between drives, protection component 446, that, for example, can protect data on a drive or between drives, or other procedure component 448 that can perform other storage performance enhancements at or between drives of storage component 410. SPEC 430 can indicate an intention to perform a SPEP at one or more drives of storage component 410, wherein the SPEP is determined via a corresponding SPEP component of SPEC 430. SDSC 420 can further comprise a notification component 424 that can cause a notification indicating SPEP restriction(s) for one or more drives storage component 410.

In embodiments, system 400 can comprise heuristic threshold component 426 that can determine performance thresholds employed by SDSC 420, for example, performance thresholds affiliated with SPEP restrictions via SORC 422. A heuristic performance threshold can be determined from historical performance of a drive(s) of storage component 410. As an example, a drive performance can degrade to a value resulting in a user indication of unsatisfactory performance being received, e.g., a client can indicate that the drive is not performing satisfactorily. This performance of the example drive, and user indications, can be employed by heuristic threshold component 426 to determine various performance thresholds. In embodiments, heuristic threshold component 426 can also analyze results of removal of SPEP restrictions and drive states to determine other performance thresholds. As such, for example, heuristic threshold component 426 can determine a first threshold that can trigger a restriction, e.g., via SDSC 430, and a second threshold that can trigger reverting to an unrestricted condition, with first and second thresholds can be based on historic drive performance, modeled drive performance, or other storage system data. In embodiments, system 400 can comprise command component 428, which can cause to SDSC to restrict a SPEP permission based on command component 428 receiving a command. Similarly, command component 428 can enable releasing, changing, or modifying SPEP restrictions via input commands, for example received from storage system maintenance systems based on sysadmin input, from client devices, etc. In an example, a sysadmin can indicate a manually selected performance threshold that can be communicated via command component 428 to SDSC 420 that can correspondingly cause SPEP restrictions supplanting some, node, or all SPEP restrictions determined via SORC 422.

Figure 5:
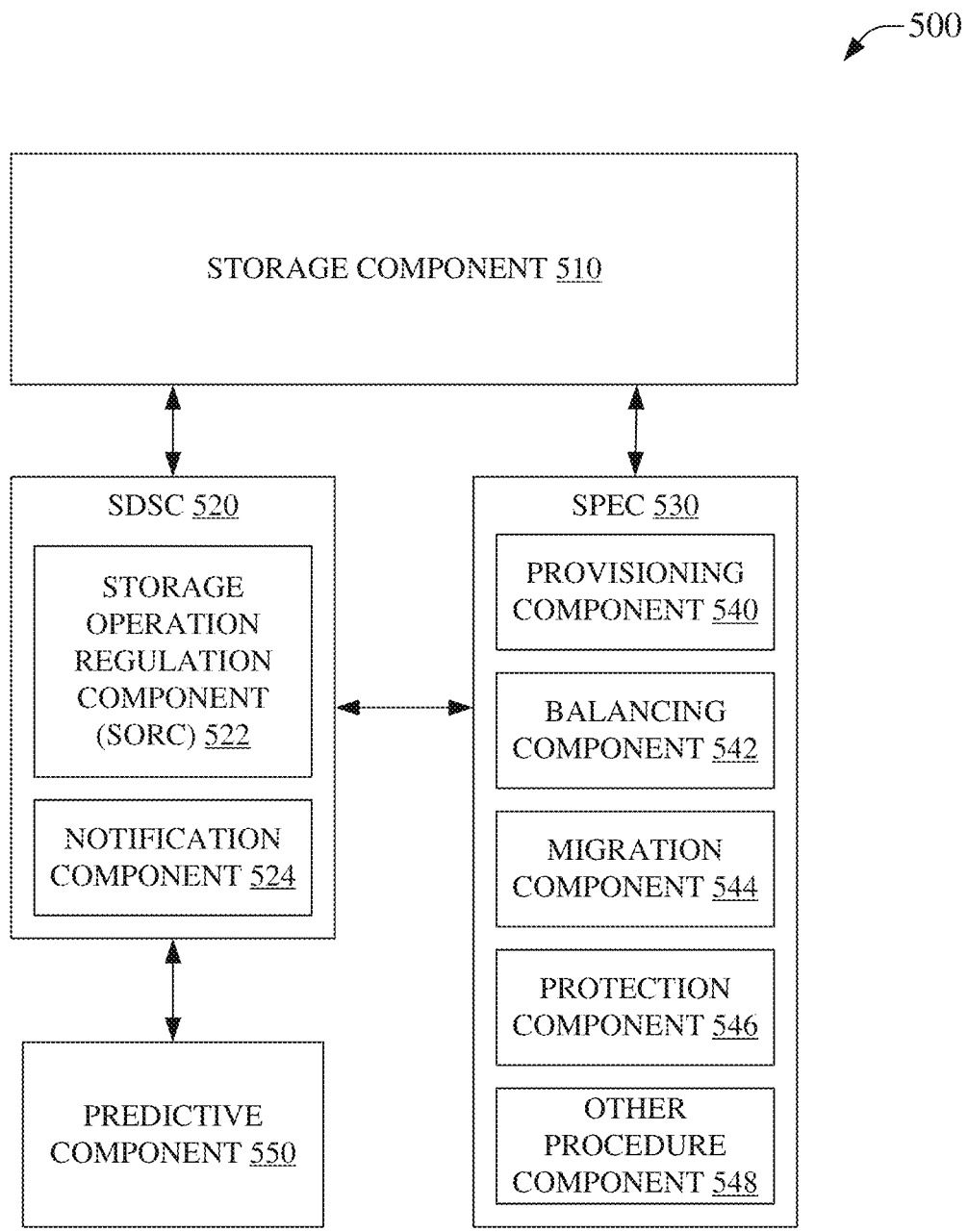
FIG. 5 is an illustration of an example system that can facilitate shielding a storage device of a storage system based on predicting a performance change corresponding to performing an SPEP for a given storage system state, in accordance with aspects of the subject disclosure.

FIG. 5 is an illustration of an example system 500, which can enable shielding a storage device of a storage system based on predicting a performance change corresponding to performing an SPEP for a given storage system state, in accordance with aspects of the subject disclosure. System 500 can comprise storage component 510 that can comprise storage devices. A storage device can store data at one or more storage elements comprised in the storage device. In embodiments, a storage system can comprise one or more of storage component 510, which can comprise one or more drives.

System 500 can comprise SDSC 520 that can restrict permissions for performance of SPEPs that can be indicated by SPEC 530, e.g., shielding interactions with storage devices of storage comp 510. SDSC 520 can comprise SORC 522, that can determine what SPEP permission restrictions can be associated with different levels of performance degradation for drives. In embodiments SORC 522 can establish tiers of restrictions to permissive performance of SPEPs. SPEPs can be treated individually, or can be included in more than one tier of restrictions determined at SORC 522. SPEPs can be affiliated with corresponding SPEP components, e.g., provisioning component 540 that, for example, can allocate storage space of a drive, balancing component 542 that, for example, can rebalance storage on a drive or between drives, migration component 544 that, for example, can move data within a drive or between drives, protection component 546, that, for example, can protect data on a drive or between drives, or other procedure component 548 that can perform other storage performance enhancements at or between drives of storage component 510. SPEC 530 can indicate a SPEP to be performed at one or more drives of storage component 510, wherein the SPEP is determined via a corresponding SPEP component of SPEC 530. SDSC 520 can further comprise a notification component 524 that can cause a notification indicating SPEP restriction(s) for one or more drives storage component 510.

In embodiments, system 500 can comprise predictive component 550 that can predict performance thresholds of drives, which predicted performance thresholds can be employed by SDSC 520 to enact one or more SPEP permission restrictions. A predicted performance threshold can be determined via modeling based on historical performance, machine learning, or other artificial intelligence technologies. As an example, a machine learning technology embodied in predictive component 550 can predict that drive performance will degrade to an unsatisfactory level of performance, which prediction can be employed by SDSC 520 to shield a drive of storage component 510 from one or more SPEP. As such, patterns of drive usage can be used to learn when SPEP restriction can be desirable. This can be particularly useful where machine learning can enable running of storage component 510 with much narrower margins of unused storage space by effectively predicting when a drive performance will be compromised and proactively shielding the drive to allow the drive to draw down with minimal impact on performance. In some embodiments this can be regarded as enabling returning a drive to a non-restricted state quickly by anticipating performance issues and taking mitigation measures proactively. In some embodiments, predictive shielding can even prevent drives from entering a state with significant restrictions, e.g., allowing drives to run on a razor-thin level of performance that is neither wasteful of free space on the drive nor allowed to become so overfull as to dramatically affect drive performance, e.g., the drive can run at a determined or selected level of storage optimization to performance level as regulated by a predictive shielding supported via predictive component 550 and SDSC 520.

Figure 6:
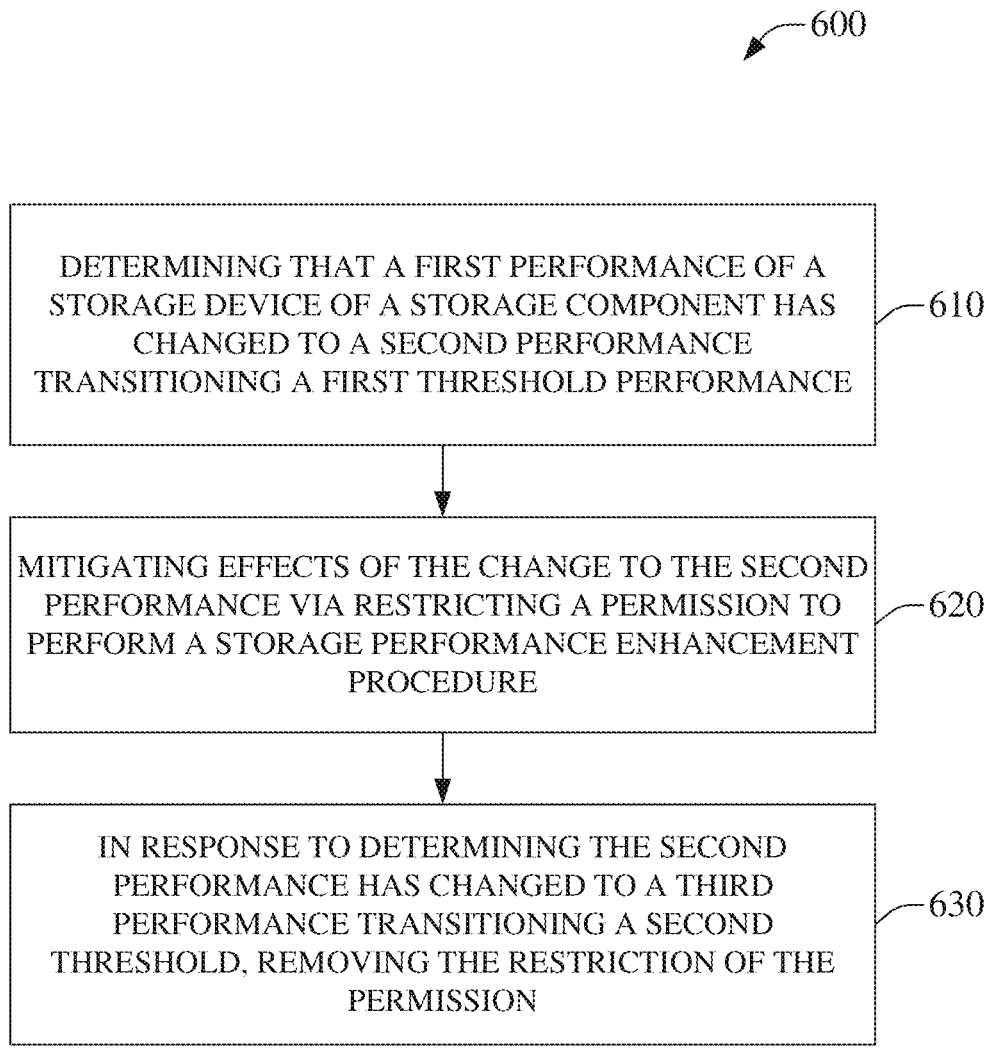
FIG. 6 is an illustration of an example method enabling shielding a storage device of a storage system, in accordance with aspects of the subject disclosure.
Figure 7:
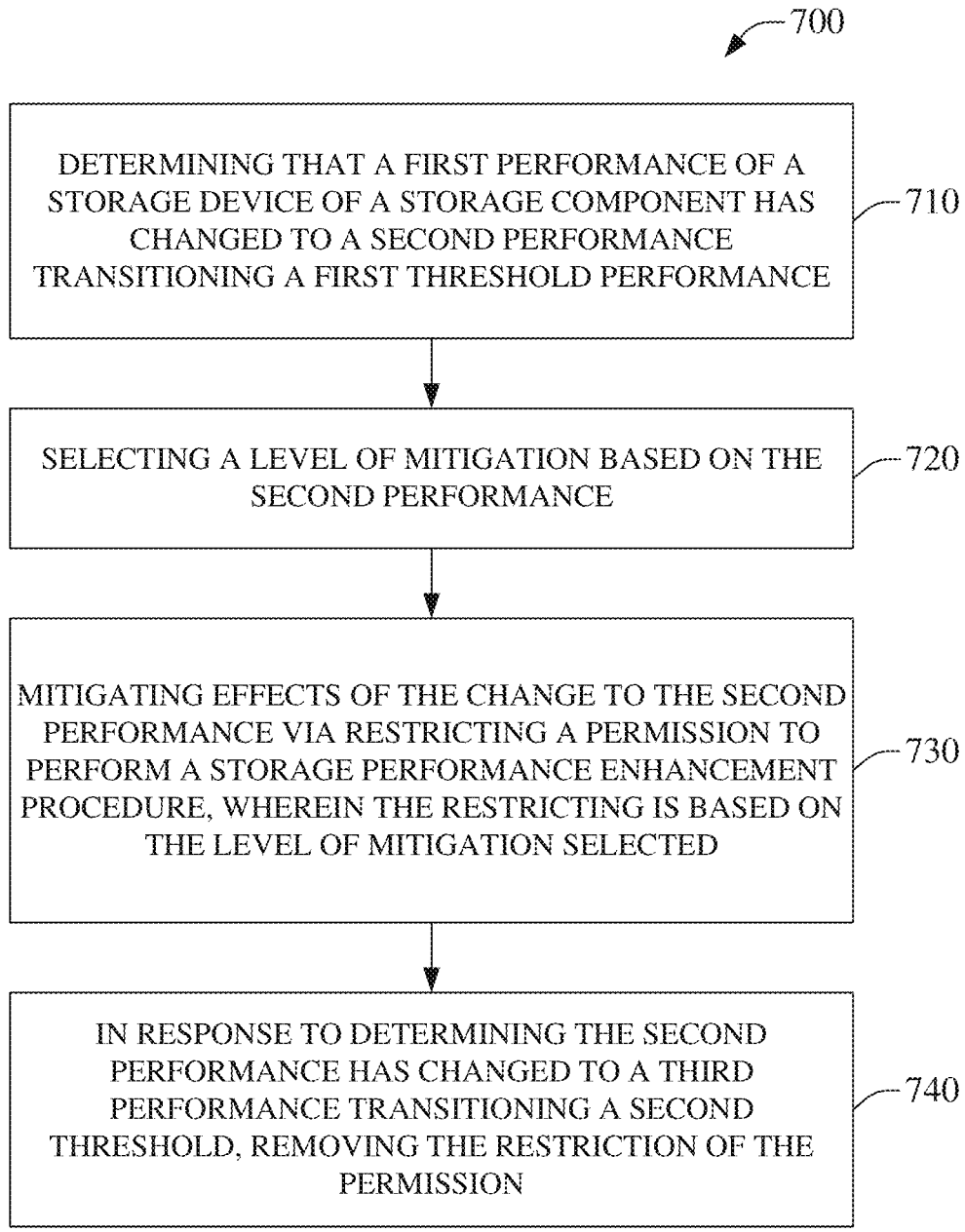
FIG. 7 is an illustration of an example method facilitating shielding a storage device of a storage system by selectively withholding permission to perform one or more SPEP storage system based on a state of the storage system, in accordance with aspects of the subject disclosure.
Figure 8:
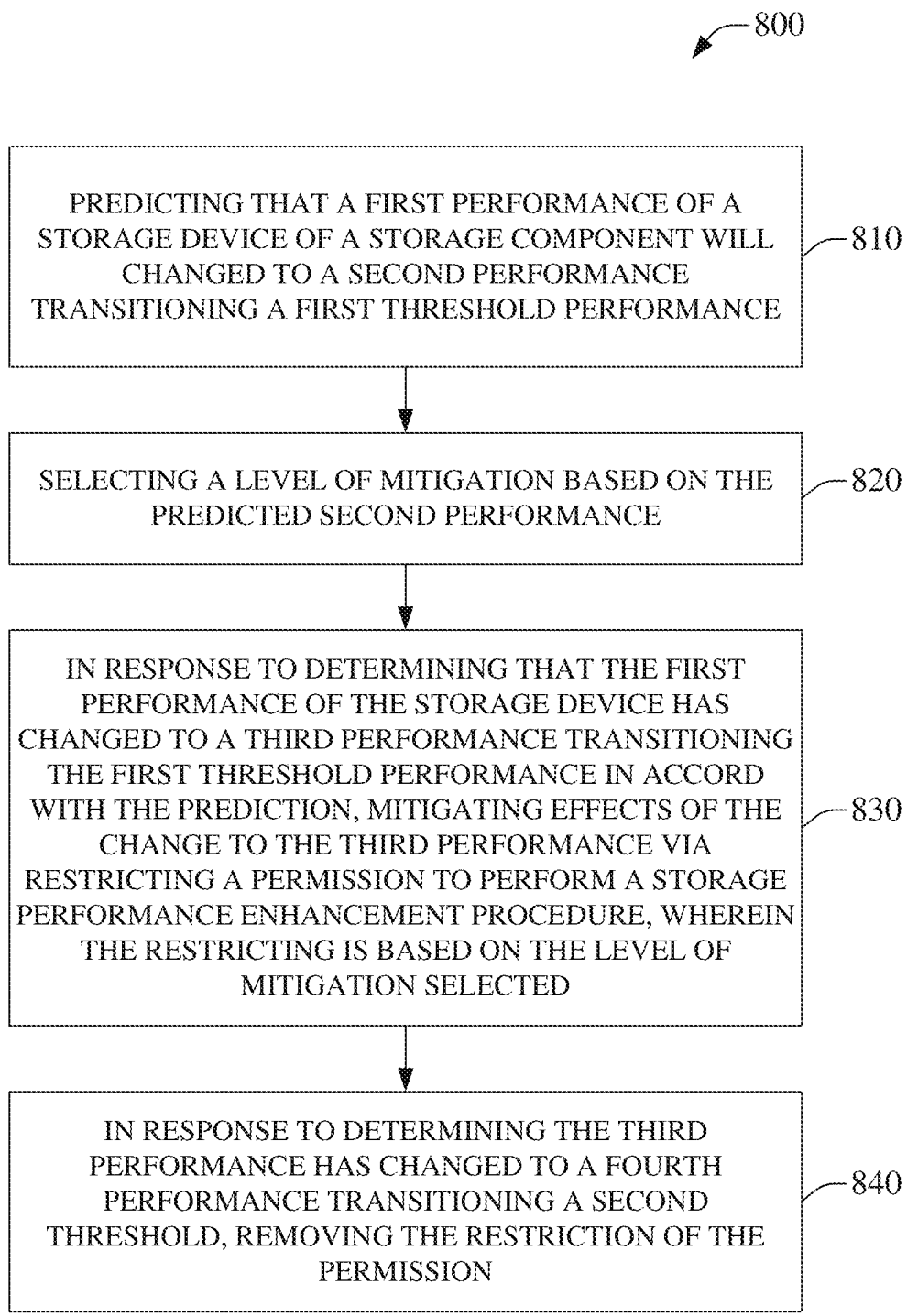
FIG. 8 is an illustration of an example method facilitating shielding a storage device of a storage system based on predicting a performance change corresponding to performing an SPEP for a given storage system state, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600 that can facilitate shielding a storage device of a storage system, in accordance with aspects of the subject disclosure. At 610, method 600 can comprise determining that a first performance of a storage device of a storage component, e.g., a drive, has changed to a second performance, wherein the change transitions a first threshold performance. In an embodiment, the first performance can embody a first state of a drive, e.g., reflecting a previous performance of the drive. At 610, the change to the second performance can result in the drive transitioning a threshold performance, e.g., the drive can underperform when storage performance enhancement procedures (SPEPs) are performed at the drive when the drive is in the second performance state. Accordingly, it is desirable to avoid compromising performance by running one or more SPEPs when the drive is in the second performance state. As such, shielding the drive from or more SPEPs can allow the drive to be read from and written to by one or more non-SPEP process while avoiding performance degradation associated with performing one or more SPEPs. Accordingly, permission to perform one or more SPEPs can be restricted based on the drive being in the second state via transitioning the threshold performance.

Method 600, at 620, can comprise mitigating effects of the change to the second performance via restricting a permission to perform a storage performance enhancement procedure. Mitigating can comprise shielding a drive from one or more SPEPs via restricting permission to perform the one or more SPEPs for the drive. In this regard, embodiments of method 600 can permit reading, writing, copying, moving, etc., of data outside of a SPEP process, e.g., letting a client write data to existing allocated storage, etc., but can prevent damaging performance by permitting a SPEP to affect the drive. Shielding can therefore avoid the loss of data access associated with failing a drive and can also avoid the data recovery process associated with failing a drive or smart-failing a drive. Moreover, by shielding the drive, the drive can, via attrition, free space storing stale data, e.g., drawing the drive down to a less encumbered level by freeing space while shielded to a point where the drive has enough room to perform SPEPs without restriction.

At 630, method 600, can comprise removing the restriction of the permission. At this point method 600 can end. The removing of the restriction can be in response determining the second performance has changed to a third performance transitioning a second threshold. In embodiments, where a drive returns to a level of performance wherein a SPEP doesn't significantly deteriorate performance, the restrictions on permitting SPEPs at the drive can be rescinded. As such, where the drive transitions from the second performance, which was associated with SPEP restriction, transitioning a second threshold to a third performance that is not associated with performed degradation, SPEP restrictions can be altered, updated, modified, replaced, etc., e.g., the SPEP restriction at 620 can be removed when the drive is no longer overburdened.

FIG. 7 is an illustration of an example method 700 that can facilitate shielding a storage device of a storage system by selectively withholding permission to perform one or more SPEP storage system based on a state of the storage system, in accordance with aspects of the subject disclosure. At 710, method 700 can comprise determining that a first performance of a storage device of a storage component, e.g., a drive, has changed to a second performance, wherein the change transitions a first threshold performance. In an embodiment, the first performance can embody a first state of a drive, e.g., reflecting a previous performance of the drive. At 710, the change to the second performance can result in the drive transitioning a threshold performance, e.g., the drive can underperform when SPEPs are performed at the drive when the drive is in the second performance state. Accordingly, it is desirable to avoid compromising performance by running one or more SPEPs when the drive is in the second performance state. As such, shielding the drive from or more SPEPs can allow the drive to be read from and written to by one or more non-SPEP process while avoiding performance degradation associated with performing one or more SPEPs. Accordingly, permission to perform one or more SPEPs can be restricted based on the drive being in the second state via transitioning the threshold performance.

Method 700, at 720, can comprise selecting a level of mitigation based on the second performance. In this regard, embodiments of method 700 can designate different levels of mitigation to different levels of performance, e.g., the worse the second level of performance is, the more restrictive the permissions on SPEPs can be. Wherein some SPEPs can be more demanding than other SPEPs, it can be preferred to permit SPEPs at a drive when those particular SPEPs aren't expected to overly hinder drive performance while restricting permission to perform other more demanding SPEPs that are expected to degrade drive performance, see discussions of SORC 322, 422, 522, etc. As such, the second performance can be associated with different levels of SPEP restriction.

At 730, method 700 can comprise mitigating effects of the change to the second performance via restricting a permission to perform a storage performance enhancement procedure. The restricting can be based on the level of mitigation selected at 720. Mitigating can comprise shielding a drive from one or more SPEPs via restricting permission to perform the one or more SPEPs for the drive. In this regard, embodiments of method 700 can permit reading, writing, copying, moving, etc., of data outside of a restricted SPEP process. Shielding can therefore avoid some of the problems of failing or smartfailing a drive. Moreover, a shielded drive can transition to another state due to factors such as freeing space holding stale data, etc., e.g., drawing the drive down to a less encumbered level by freeing space while shielded. Wherein the drive can be more or less affected at the second performance level, a corresponding level of mitigation can also enable performing some, if not all, SPEPs for the drive in some states. It is noted that some levels of mitigation can restrict all SPEP permissions.

At 740, method 700, can comprise removing a SPEP restriction. At this point method 700 can end. The removing of the restriction can be in response determining the second performance has changed to a third performance transitioning a second threshold. In embodiments, where a drive returns to a level of performance wherein a SPEP doesn't significantly deteriorate performance, the restrictions on permitting SPEPs at the drive can be rescinded. As such, where the drive transitions from the second performance, which was associated with SPEP restriction, transitioning a second threshold to a third performance that is not associated with performed degradation, SPEP restrictions can be altered, updated, modified, replaced, etc., e.g., the SPEP restriction at 730 can be removed when the drive is no longer overburdened. In some embodiments, it is noted that the third performance of the drive can still be less than permitting all SPEPs, e.g., the drive can become less burdened facilitating operation of more SPEPs, even where not all SPEPs may yet be permitted. Moreover, eventually, the drive can achieve a sufficiently unburdened state that can allow all SPEP restrictions to be removed.

FIG. 8 is an illustration of an example method 800, which can enable shielding a storage device of a storage system based on predicting a performance change corresponding to performing an SPEP for a given storage system state, in accordance with aspects of the subject disclosure. At 810, method 800 can comprise predicting that a first performance of a storage device of a storage component, e.g., a drive, has changed to a second performance, wherein the change transitions a first threshold performance. In an embodiment, the first performance can embody a first state of a drive, e.g., reflecting a previous performance of the drive. At 810, a predicted change to the second performance can anticipate the drive transitioning a threshold performance, e.g., the drive can be expected to underperform when SPEPs are performed at the drive when the drive eventually is in the second performance state. Accordingly, it can be desirable to avoid compromising performance by proactively restricting permission for performing one or more SPEPs when the drive is predicted to enter the second performance state. As such, proactively shielding the drive from or more SPEPs can allow the drive to be read from and written to by one or more non-SPEP process while avoiding performance degradation associated performing one or more SPEPs when the drive is predicted to enter the second performance. Accordingly, permission to perform one or more SPEPs can be restricted based on the drive being predicted to go into the second state and transitioning the threshold performance.

Method 800, at 820, can comprise selecting a level of mitigation based on the predicted second performance. In this regard, embodiments of method 800 can designate different levels of mitigation to different levels of performance, e.g., the worse the second level of performance is predicted to be, the more restrictive the permissions on SPEPs can be. Wherein some SPEPs can be more demanding than other SPEPs, it can be preferred to permit SPEPs at a drive when those particular SPEPs aren't expected to overly hinder drive performance while restricting permission to perform other more demanding SPEPs that are expected to degrade drive performance, again see discussions of SORC 322, 422, 522, etc. As such, the predicted second performance can be associated with different levels of SPEP restriction.

At 830, method 800 can comprise mitigating effects of a change to a third performance via restricting a permission to perform a storage performance enhancement procedure. The restricting can be based on the level of mitigation selected at 820. In this regard, the actual change to the third performance can be comparable to the predicted change to the second performance, e.g., the second performance is predicted but embodied in the actual transition to a third performance. Mitigating can comprise shielding a drive from one or more SPEPs via restricting permission to perform the one or more SPEPs for the drive. In this regard, embodiments of method 800 can permit reading, writing, copying, moving, etc., of data outside of a restricted SPEP process. Shielding can therefore avoid some of the problems of failing or smartfailing a drive. Moreover, a shielded drive can transition to another state due to factors such as freeing space holding stale data, etc., e.g., drawing the drive down to a less encumbered level by freeing space while shielded. Wherein the drive can be more or less affected at the third performance level, a corresponding level of mitigation, e.g., predicted for the second performance level, can also enable performing some, if not all, SPEPs for the drive in some states. It is noted that some levels of mitigation can restrict all SPEP permissions.

At 840, method 800, can comprise removing a SPEP restriction. At this point method 800 can end. The removing of the restriction can be in response determining the third performance has changed to a fourth performance transitioning a second threshold. In embodiments, where a drive returns to a level of performance wherein a SPEP doesn't significantly deteriorate performance, the restrictions on permitting SPEPs at the drive can be rescinded. As such, where the drive transitions from the third performance, which was associated with SPEP restriction based on the predicted second performance, transitioning a second threshold to a fourth performance that is not associated with performed degradation, SPEP restrictions can be altered, updated, modified, replaced, etc., e.g., the SPEP restriction at 830 can be removed when the drive is no longer overburdened. In some embodiments, it is noted that the fourth performance of the drive can still be less than permitting all SPEPs, e.g., the drive can become less burdened facilitating operation of more SPEPs, even where not all SPEPs may yet be permitted. Moreover, eventually, the drive can achieve a sufficiently unburdened state that can allow all SPEP restrictions to be removed.

Figure 9:
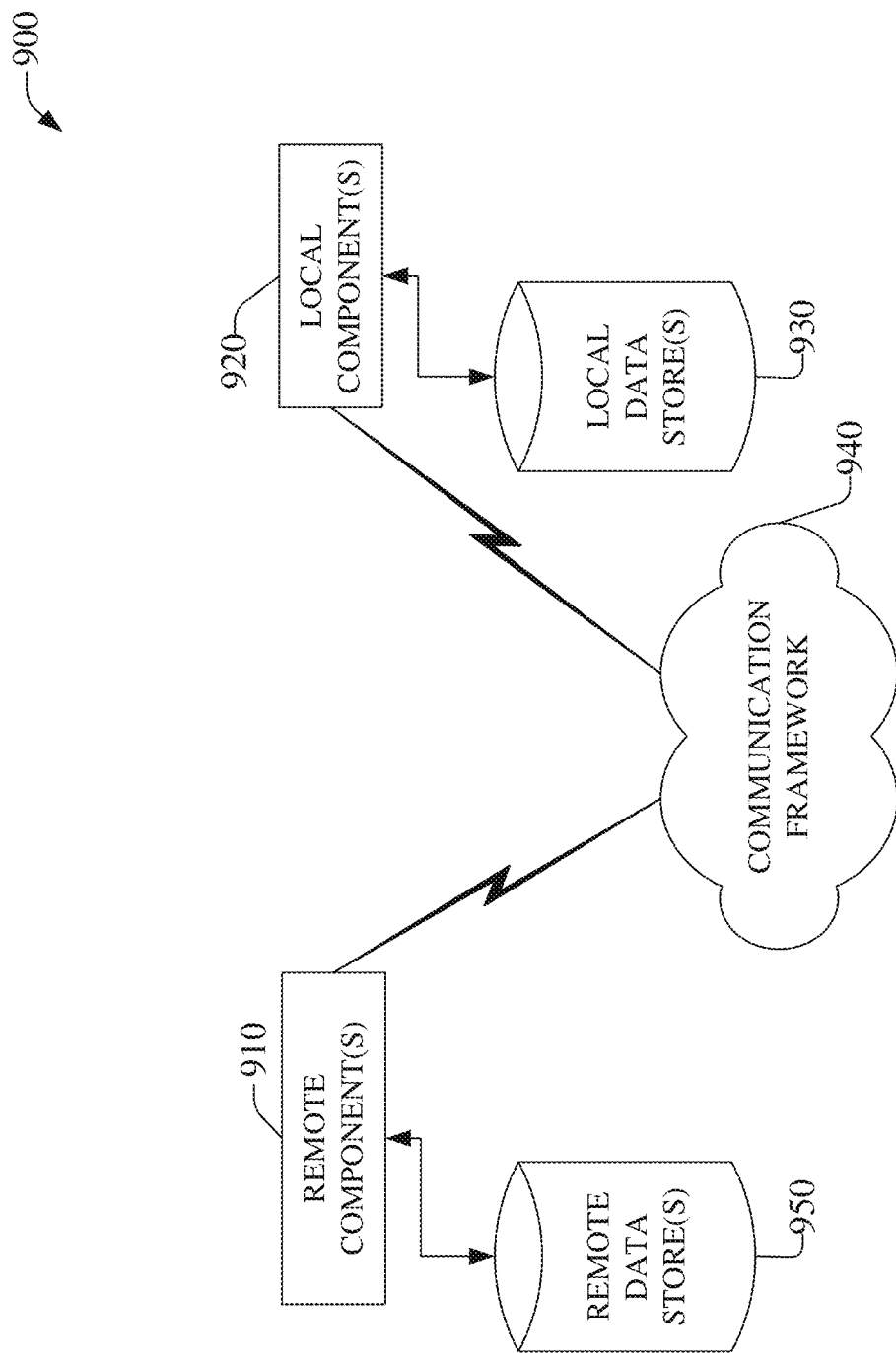
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 110-510, etc., a remotely located processor device comprised in storage device shielding component 120-520, etc., or other remotely located devices, which can be connected to a local component via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 110-510, etc., a locally located processor device comprised in storage device shielding component 120-520, etc., or other locally located devices.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, instructions restricting permission to perform one or more storage performance enhancement procedures, communicating a command via command component 428, communicating heuristic thresholds, communicating machine learning, artificial intelligence, etc., determined performance predictions, via predictive component 550, or other communications can be communicated via communication framework 940 among local components, remote components, or combinations thereof, as disclosed herein.

Figure 10:
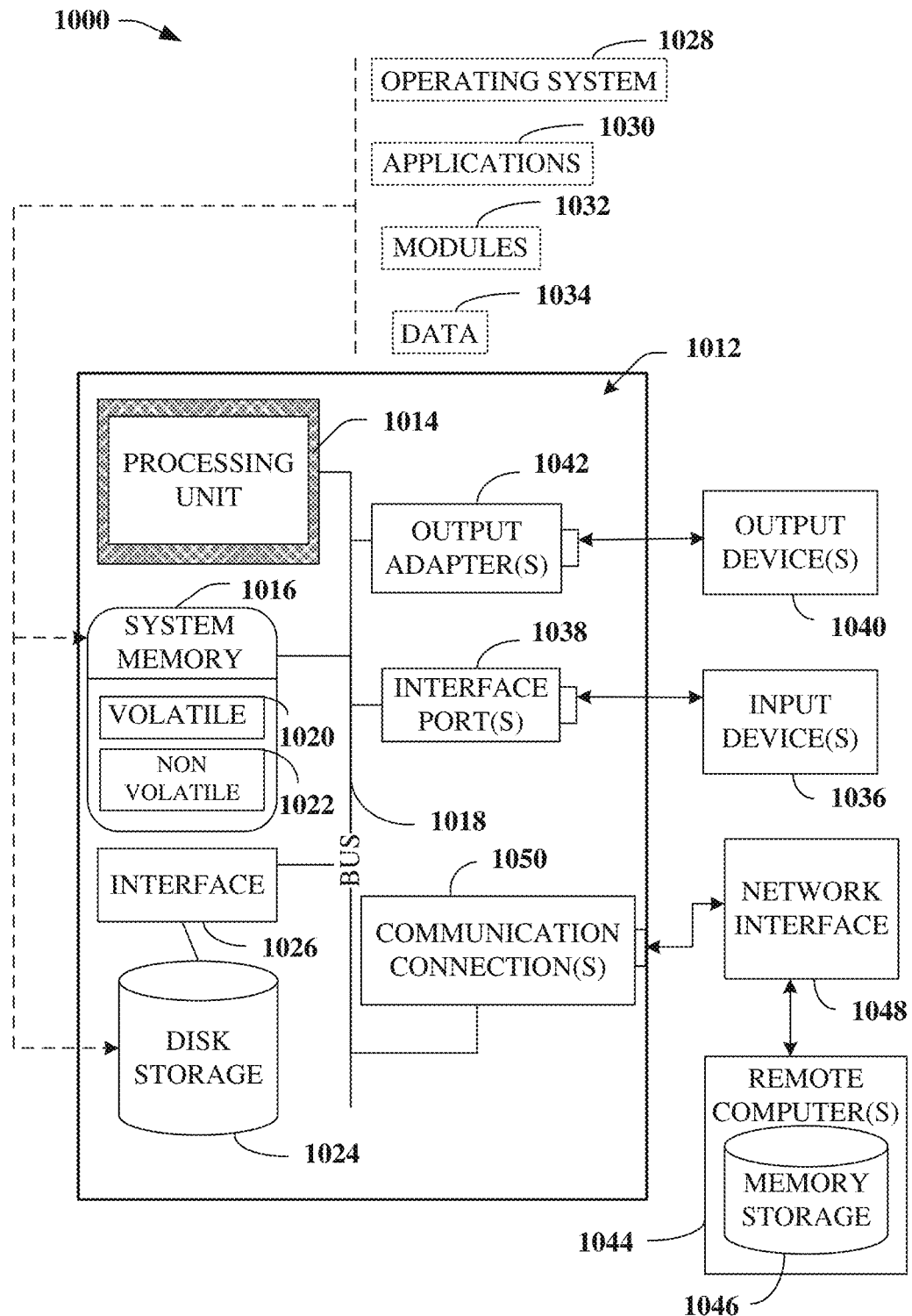
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 110-510, etc., a processor device comprised in storage device shielding component 120-520, etc., or other devices, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Machine-readable storage media, which can include any computer-readable storage media, can be any available storage media that can be accessed by the machine or computer and can comprise both volatile and nonvolatile media, and removable and non-removable media. By way of example, and not limitation, machine-readable storage media can be implemented in connection with any method or technology for storage of information such as computer-readable instructions, program modules, structured data, or unstructured data. Machine-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not exclusively propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not exclusively propagating transitory signals per se. Machine-readable storage media can be accessed by one or more local or remote computing devices, e.g., via access requests, queries or other data retrieval protocols, for a variety of operations with respect to the information stored by the medium. As such, for example, a machine-readable medium can comprise executable instructions stored thereon that, in response to execution, can cause a system comprising a processor to perform operations comprising receiving an indication that a storage device of a storage system has transitioned a first level of performance and, in response to receiving the indication, shielding the storage device based on a performance state of the storage device. The shielding can block performance of at least a first storage performance enhancement procedure at the storage device.

Communications media typically embody machine-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (k) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining a first change in performance of a storage device of a storage system, wherein the first change is from a first performance state to a second performance state, and wherein the first change to the second performance state transitions a first threshold performance level;
mitigating a first subsequent performance deterioration of the storage device in the second performance state via restricting a first permission to perform a first storage performance enhancement procedure at the storage device in the second performance state; and
enabling further mitigation of a second subsequent performance deterioration of the storage device based on determining a second change in the performance of the storage device, wherein the second change is from the second performance state to a third performance state, and wherein the second change to the third performance state transitions a second threshold performance level.

2. The system of claim 1, wherein the mitigating permits reading data from the storage device in the second performance state.

3. The system of claim 1, wherein the mitigating permits writing data to the storage device in the second performance state, and wherein the writing data is not affiliated with the first storage performance enhancement procedure.

4. The system of claim 1, wherein the mitigating does not comprise restricting a second permission to perform a second storage performance enhancement procedure at the storage device in the second performance state.

5. The system of claim 1, wherein the mitigating comprises restricting a second permission to perform a second storage performance enhancement procedure at the storage device in the second performance state.

6. The system of claim 1, wherein the operations further comprise, in response to the second change to the third performance state, updating the restricting of the first permission to a second permission, and wherein the second permission does not restrict performance of the first storage performance enhancement procedure at the storage device in the third performance state.

7. The system of claim 1, wherein the further mitigation does not comprise restricting a third permission to perform a second storage performance enhancement procedure at the storage device in the third performance state.

8. The system of claim 1, wherein the further mitigation comprises restricting a third permission to perform a second storage performance enhancement procedure at the storage device in the third performance state.

9. The system of claim 1, wherein the operations further comprise, in response to the second change to the third performance state, updating the restricting of the first permission to a second permission, and wherein the second permission maintains the restricting of the performance of the first storage performance enhancement procedure at the storage device in the third performance state.

10. The system of claim 9, wherein the further mitigation comprises:
restricting a third permission to perform a second storage performance enhancement procedure at the storage device in the third performance state, and
restricting a fourth permission to perform a third storage performance enhancement procedure at the storage device in the third performance state.

11. The system of claim 1, wherein the determining of the first change is in response to a command received via a user interface device.

12. The system of claim 1, wherein the determining of the first change is initiated in response to an indication inferred via a machine learning process.

13. The system of claim 1, wherein the first storage performance enhancement procedure is selected from a group of storage performance enhancement procedures comprising a storage provisioning procedure, a storage balancing procedure, a stored data migration procedure, and a stored data protection procedure.

14. A method, comprising:
in response to determining, by a system comprising a processor, that a storage device of a storage system has transitioned a first level of performance, determining a first shielding response based on a first performance state of the storage device, wherein the first shielding response limits a first permission to perform at least a first storage performance enhancement procedure at the storage device;
determining, by the system, a second shielding response based on a second performance state of the storage device, wherein the second shielding response limits a second permission to perform at least the first storage performance enhancement procedure at the storage device; and
shielding, by the system, the storage device in accord with a shielding response selected from a group of shielding responses comprising the first shielding response and the second shielding response.

15. The method of claim 14, further comprising, in response to determining that the storage device has transitioned a second level of performance, updating, by the system, the shielding response to further limit a corresponding permission to perform at least a second storage performance enhancement procedure at the storage device.

16. The method of claim 14, further comprising, in response to determining that the storage device has transitioned a second level of performance, updating, by the system, the shielding response to permit the performance of at least the first storage performance enhancement procedure at the storage device.

17. A non-transitory machine-readable medium, comprising executable instructions that, when executed by a processor, facilitate performance of operations, comprising:
receiving an indication that a storage device of a storage system has transitioned a first level of performance;
in response to receiving the indication, shielding the storage device based on a first performance state of the storage device, wherein the shielding blocks performance of at least a first storage performance enhancement procedure at the storage device; and
in response to receiving a subsequent indication, subsequent to receiving the indication, that the storage device has transitioned a second level of performance, shielding the storage device based on a second performance state of the storage device, wherein the shielding blocks performance of at least the first storage performance enhancement procedure at the storage device.

18. The non-transitory machine-readable medium of claim 17, wherein the operations further comprise, in response to determining that the storage device has transitioned the second level of performance, updating the shielding to further block performance of at least a second storage performance enhancement procedure at the storage device.

19. The non-transitory machine-readable medium of claim 17, wherein the operations further comprise, in response to determining that the storage device has transitioned the second level of performance, updating the shielding to instead permit performance of at least the first storage performance enhancement procedure at the storage device.

20. The non-transitory machine-readable medium of claim 17, wherein the receiving the indication that the storage device has transitioned the first level of performance is in response to a command received via a user interface device.

* * * * *